United States Patent [19]

Arosio

[11] Patent Number: 5,662,141
[45] Date of Patent: Sep. 2, 1997

[54] LEAK-RESISTANT FLUID COUPLING ARRANGEMENT

[75] Inventor: Massimo Arosio, Rivolta D'Adda, Italy

[73] Assignee: Faster S.r.l., Milan, Italy

[21] Appl. No.: 692,315

[22] Filed: Aug. 5, 1996

Related U.S. Application Data

[63] Continuation of Ser. No. 463,313, Jun. 2, 1995, abandoned.

[30] Foreign Application Priority Data

Jun. 10, 1994 [IT] Italy ............................ MI94A1218

[51] Int. Cl.⁶ .................................................... F16L 37/28
[52] U.S. Cl. ............................... 137/614.05; 137/614.03
[58] Field of Search ........................ 137/614.03, 614.04, 137/614.05, 614

[56] References Cited

U.S. PATENT DOCUMENTS

| | | | |
|---|---|---|---|
| 3,464,436 | 9/1969 | Bruning | 137/614.03 X |
| 4,289,164 | 9/1981 | Ekman | 137/614.03 |
| 4,924,909 | 5/1990 | Wilcox | 137/614.03 X |
| 5,123,448 | 6/1992 | Kjellberg et al. | 137/614.03 |
| 5,191,914 | 3/1993 | Gonzalez | 137/614.03 |

*Primary Examiner*—Kevin Lee
*Attorney, Agent, or Firm*—Kirschstein et al.

[57] ABSTRACT

A leak-resistant fluid coupling arrangement includes two coupling assemblies, each having valves for preventing fluid flow in a disconnected state, and for permitting fluid flow in a connected state. The valve in one of the assemblies is mounted within a tubular body having an external stop. A sleeve is mounted exteriorly of the tubular body. A spring bears against the sleeve and the stop to resiliently position a front surface of the tubular body adjacent an end wall of the valve. In the other assembly, the valve is located between a tubular part and a second tubular body, and has a seal that engages an internal shoulder of the second body. Apertures extend through the seal. A spring resiliently positions an end wall of the tubular part adjacent a front region of the second body. In the connected state, the seal is disengaged from the shoulder, and fluid flows through the apertures.

4 Claims, 5 Drawing Sheets

LEAK-RESISTANT FLUID COUPLING ARRANGEMENT

This is a continuation of application Ser. No. 08/463,313, filed Jun. 2, 1995, now abandoned.

BACKGROUND OF THE INVENTION

The subject of the present invention is a quick coupling for connecting hoses carrying a pressurized fluid.

Quick couplings consisting of a female part into which a male part can be inserted are known in the prior art.

Because of the high pressures which may even reach some 100 bar in the hoses to be coupled together, it has sometimes happened in the past that while the quick couplings are being connected up, the annular seals inside the couplings come into direct contact, in the course of the coupling process, with the hydraulic fluid, which is at high pressure. As a consequence the O ring, particularly that inside the male coupling, will come into contact with a very violent flow of oil. This wears or damages the seal and leads to leaks of oil after the coupling has been put together.

SUMMARY OF THE INVENTION

It is an object of the present invention to overcome these problems and to provide a novel quick coupling that can be assembled and disassembled safely even if inside the fittings is a fluid at high pressure, and that also means that undesirable damage to the seal located inside the quick coupling is avoided with certainty and that it is consequently possible to prevent undesirable leaks of fluid.

According to the invention, this object is achieved by the fact that use is made of a quick female coupling having a fluid inlet and outlet and containing in its interior a fixed shutoff bolt acting in combination with tubular parts that can be moved against the action of spring means, and there can be inserted into the female part a male coupling fitted with a cylindrical projection having an aperture for the pressurized fluid to flow through and having internal sealing means, and that the coupling is characterized in that, housed inside the male part, is a sliding tubular part having at the front end a closed wall against which there presses a spring supported by a locally fixed support, in that the tubular part has external circumferential collar which, in the rest position, presses against an annular step on the inside of the cylindrical projection, in that the tubular part, wish the aid of an intermediate O ring, supports, and allows to slide, a shutoff body having a sealing surface which the action of a spring means presses against a shutoff shoulder on the internal circumference of the cylindrical projection and in that the shutoff body has apertures following the shutoff surface to allow a pressurized fluid to pass through.

With a quick coupling devised in accordance with the invention it becomes possible to insert the projecting portion of the male coupling into the female coupling portion. This coupling together can be done with little effort, and the O rings in the male coupling will not come into contact, during the coupling or uncoupling process, with the pressurized fluid, and the pressurized fluid will flow only and solely when the seal or seals are completely shielded.

BRIEF DESCRIPTION OF THE DRAWINGS

The subject, devised in accordance with the present invention, will now be described in greater detail in the form of embodiment provided purely by way of example and illustrated in the accompanying drawings, in which.

DETAILED DESCRIPTION OF THE PREFERRED EMBODIMENT

Figure 1:
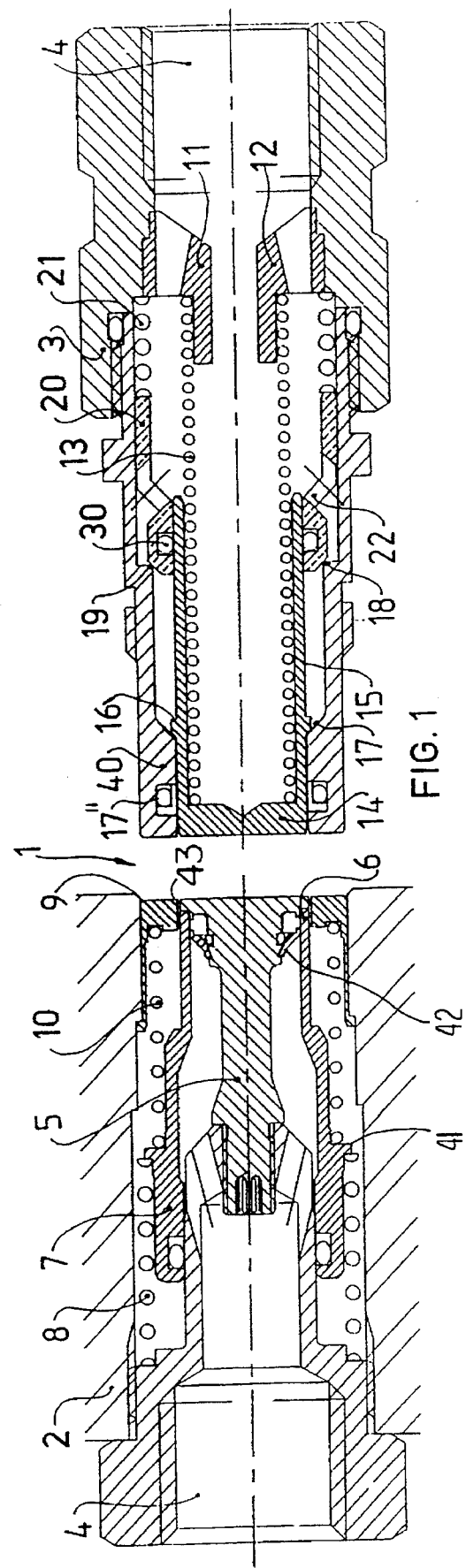
FIG. 1 shows the two components of the quick coupling in the closed position, not assembled together.

As FIG. 1 to 4 clearly show, the quick coupling, marked 1 as a whole, consists of a female part 2 and a coupling 3 forming the male part.

The part 2 has, in a known way, an axial hole 4 for the pressurized fluid to flow through. Also in a known way there is provided, in a locally fixed position inside the axial hole 4, a bolt 5 having a shutoff seat 6 acting in combination with a tubular shutoff body 7 that can be moved against the action of a spring 8 and that acts in combination with annular sleeve 9 urged by a spring 10 pressing against a stop formed on the external circumference of the tubular body 7. The sleeve 9 has a first front surface 43. The female part 2 is known in the prior art.

The coupling 3 forming the male part comprises an axial hole 4 for the pressurized fluid to flow through. Inside the hole 4 is a locally fixed support 11 comprising through apertures 12 for the fluid. A helical spring 13 presses against the support 11 and acts against the closed wall 14 of a tubular part 15 on whose external circumference is an annular projection 16 by which it presses against a stop 17 projecting from the inside of a bolt body 40. Inside the body 40, at its front, is a sealing means 17" in the form of an O ring. In addition, a step 18 which defines an annular shutoff shoulder is formed inside the body 40. Pressing against this shutoff shoulder 18 is an annular shutoff surface 19 forming part of a valve body 20, which may for example be cup-shaped and is urged by a spring 21 pressing against the fixed support 11.

Between the shutoff surface 19 and the end of the cup body 20 urged by the spring 21, are radial apertures 22 to allow the fluid to pass through.

The tubular bolt 15, which is urged by the spring 13, is pushed in the inactive condition of the coupling 3 so that its projecting collar 16 is stopped by the stop 17 so that the sealing ring 17" is covered and protected in this position. Simultaneously, the spring 21 acts on the cup body 20 and pushes its shutoff surface 19 against the shutoff edge 18 of the bolt body 40.

Thus, thanks to the provision of a sealing ring 30 situated between the cup-shaped valve body 20 and the tubular part 15, no movement of a pressurized fluid will be possible.

Figure 2:
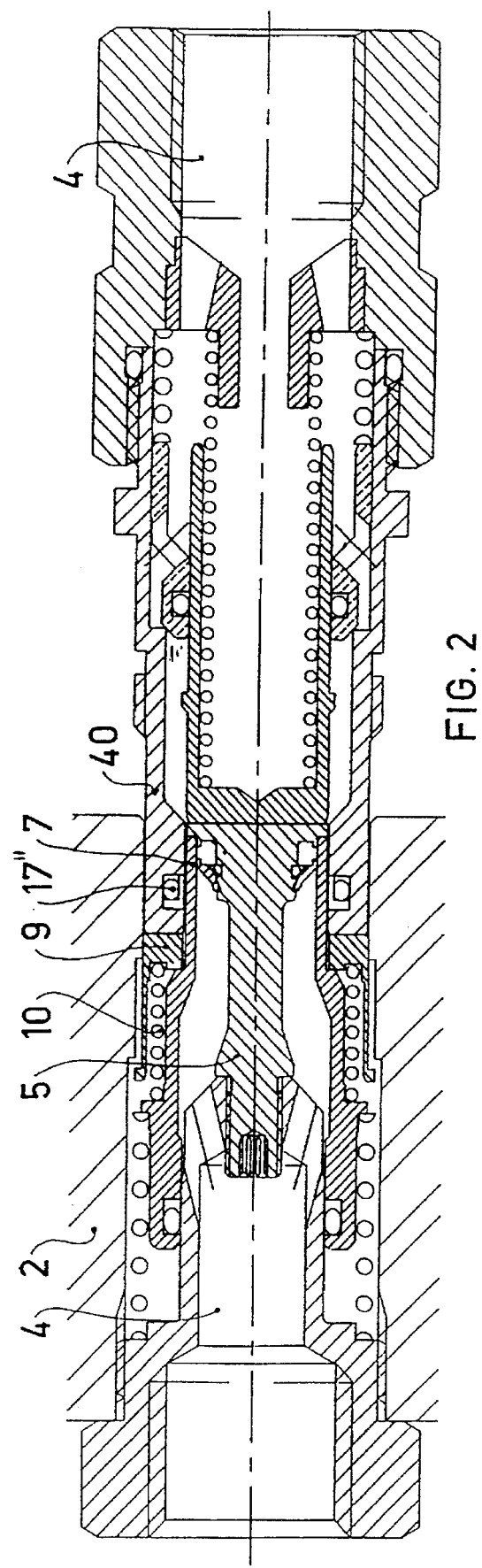
FIG. 2 shows the first stage in assembling together the two components of the quick coupling.

The insertion of the bolt body 40 of the coupling 3 into the axial hole 4 of the coupling 2, as illustrated in FIG. 2, causes the wall 14 of the tubular part 15 to press against the bolt 5 and the bolt body 40 passes into the axial hole 4 of the coupling 2, displacing as it does so the first front surface 43 of the sleeve 9 against the action of the spring 10, which spring is compressed.

The sealing ring 17" is still covered and shielded by the tubular body 7 and the fluid is still unable to flow through the holes 4.

As the bolt 40 continues to be inserted into the hole 4 of the coupling 2, the spring 10 produces a displacement of the tubular body 7, releasing the shutoff seat 6 of the bolt 5.

Figure 3:
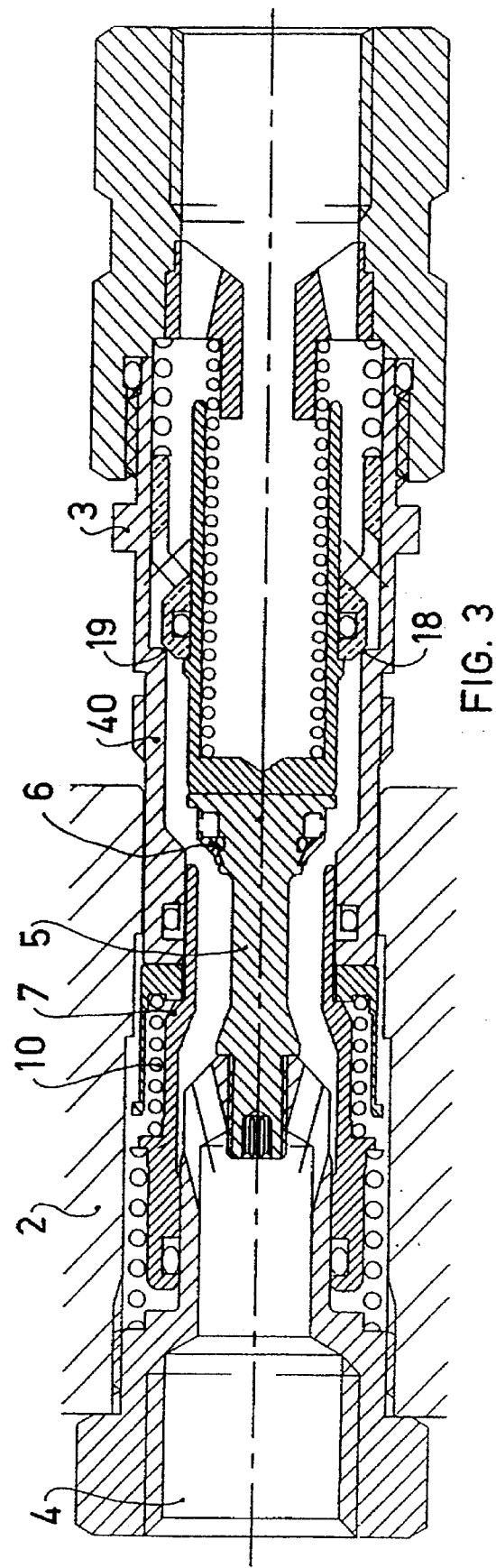
FIG. 3 shows a further position of the components of the quick coupling in the course of their assembly.
Figure 4:
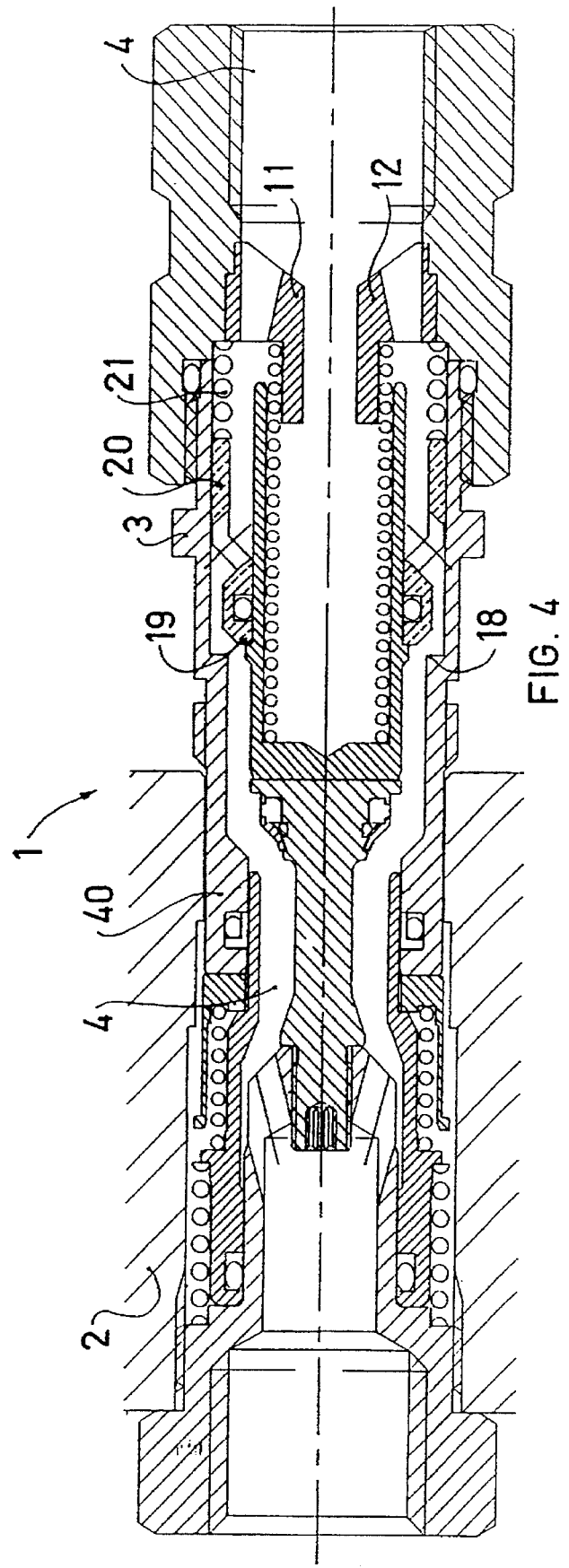
FIG. 4 shows the components of the quick coupling, now fully assembled and consequently with pressurized fluid flowing through it.

As can be seen in FIG. 3, in this condition the annular shutoff surface 19 is still pressing against the shutoff edge 18 formed on the inside of the tubular bolt 40 of the coupling 3.

The continued insertion of the coupling 3 in the hole 4 of the coupling 2 also produces an axial displacement of the cup body 20 against the action of the spring 21, causing the annular shutoff surface 19 to come away from the shutoff shoulder 18, so that it is only now that the pressurized fluid can flow along the hole 4, that is between the coupling 2 and the coupling 3 or the other way around.

Figure 5:
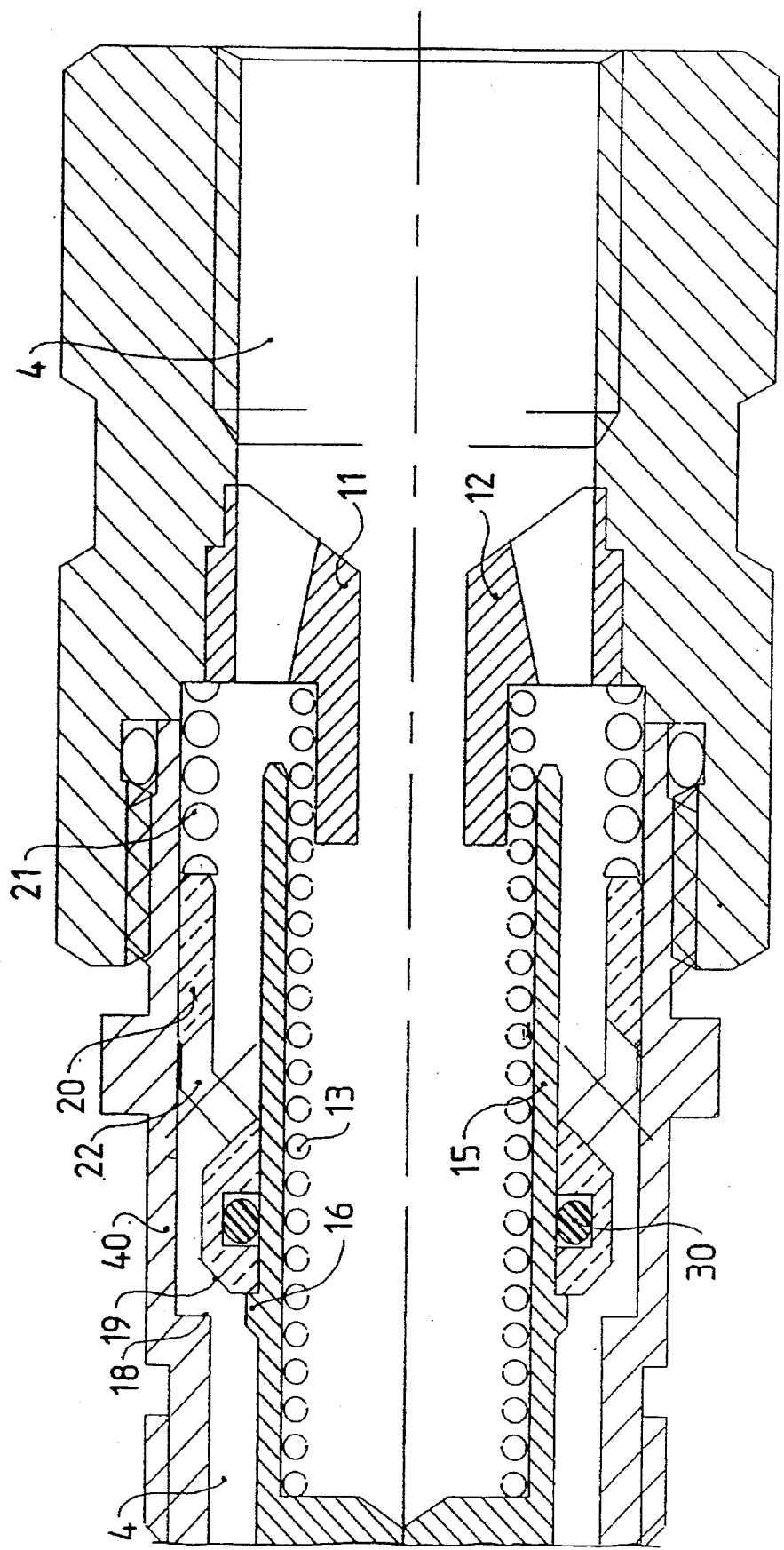
FIG. 5 shows on an enlarged scale a detail of the shutoff means located inside the male coupling.

The configuration of the component parts which allows free flow through the coupling 1 is illustrated once again on a larger scale in FIG. 5. As will be observed, the cup body 20 is pushed back by the annular projection 16 against the action of the spring 21, with the result that the annular shutoff surface 19 of the body 20 comes away from the shutoff shoulder 18, thereby permitting, only after the couplings 2 and 3 have been assembled together, unobstructed flow of the pressurized fluid through the radial holes 22 of the part 20.

I claim:

1. A leak-resistant fluid coupling arrangement, comprising:
   a) a first coupling assembly mounted in a passage extending along a longitudinal direction, and a second coupling assembly longitudinally insertable from a disconnected state into the passage to a connected state in which the assemblies are interconnected,
   b) said first coupling assembly including
      I) a first coupling member having a first fluid port,
      ii) a first movable, longitudinally-extending tubular body having an external stop,
      iii) a first valve member mounted within the first body and having a first seal for sealingly engaging the first body in the disconnected state, and also having a first end wall,
      iv) a first movable, longitudinally-extending sleeve mounted exteriorly of the first body and having a first front surface,
      v) means bearing against the sleeve and the stop for resiliently positioning the first front surface adjacent said first end wall in the disconnected state,
   c) said second coupling assembly including
      I) a second coupling member having a second fluid port,
      ii) a second longitudinally-extending tubular body having an internal shoulder and a leading front region,
      iii) a second movable, longitudinally-extending tubular part mounted within the second body and having a second end wall and an external collar,
      iv) means bearing against the second coupling member for resiliently positioning the second end wall adjacent the leading front region of the second body,
      v) a second valve member bearing against the second coupling member and situated radially intermediate the second tubular part and the second tubular body, said second valve member having a second seal for sealingly engaging the internal shoulder in the disconnected state, and also having apertures extending generally radially through the second valve member,
   d) said leading front region of the second body engaging the first front surface of the first sleeve to push the first sleeve and the first body relative to the first valve member, thereby moving the first seal out of engagement with the first body in the connected state, and
   e) said first end wall of the first valve member engaging the second end wall of the second part to cause the external collar to push the second seal out of engagement with the internal shoulder in the connected state, thereby enabling fluid flow between the ports and through the apertures in the connected state.

2. The arrangement of claim 1, wherein the external stop, the external collar, and the internal shoulder are each annular in shape.

3. The arrangement of claim 1; and further comprising a seal mounted in the leading front region of the second body, said seal facing and being enclosed by the second part in the disconnected state, said seal facing and being enclosed by the first tubular body in the connected state.

4. The arrangement of claim 1, wherein the second valve member includes a sealing ring for sealingly engaging the second part in both the disconnected and connected states.

* * * * *